Dec. 11, 1934.  J. O. ALMEN ET AL  1,984,006
HOOP GOVERNOR WITH DOUBLE ACTING WEIGHT
Filed July 11, 1932   2 Sheets-Sheet 1
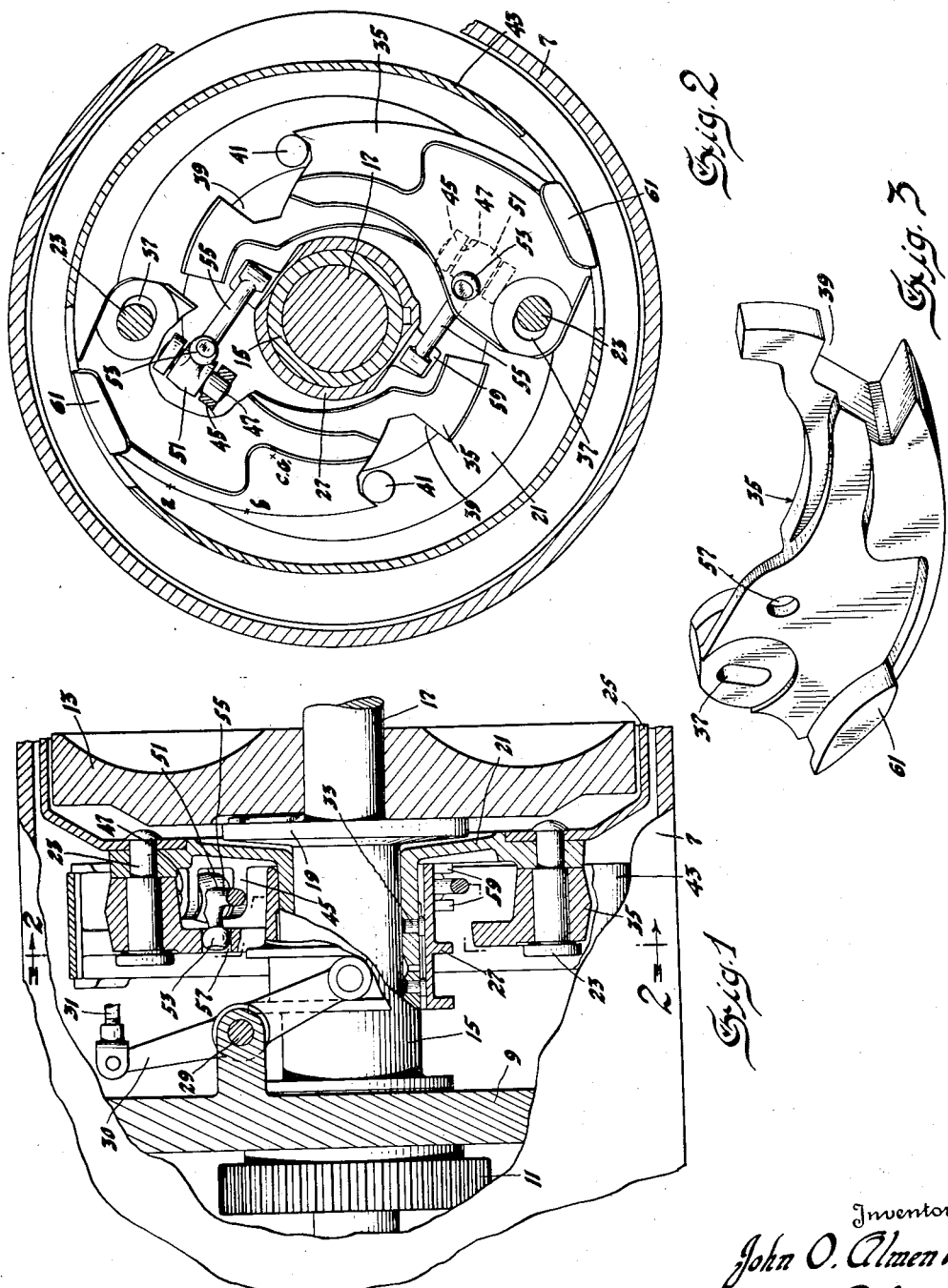

Patented Dec. 11, 1934

1,984,006

UNITED STATES PATENT OFFICE 1,984,006

HOOP GOVERNOR WITH DOUBLE ACTING WEIGHT

John O. Almen, Royal Oak, and John Dolza, Flint, Mich., assignors, by mesne assignments, to General Motors Corporation, Detroit, Mich., a corporation of Delaware Application July 11, 1932, Serial No. 621,764

6 Claims. (Cl. 264—16)

This invention relates to hoop type governors and has been designed more particularly for use on motor vehicles where driving ratio changing is made automatically responsive to the speed of a rotating shaft.

An object of the invention is to render such a governor operable in two stages whereby the influence it exerts on the ratio changing mechanism is modified. By the use of such a two-stage governor, when used to shift drive ratios, there is a first and a secondary stage of operation, as a result of which the rate of shift of the change speed mechanism toward high speed is retarded during the second stage, thereby securing improved engine performance.

Another object is to produce a two-stage governor by the use of a weight or weights each of which has a two-stage operation.

Other objects of the invention include simplicity and efficiency.

The invention is illustrated on the accompanying drawings in which—

Fig. 1 is a longitudinal section showing the governor associated with the transmission.

Fig. 2 is a transverse section from line 2—2 of Fig. 1 through the housing showing the governor elements in elevation.

Fig. 3 is a perspective of one of the centrifugal weights.

Figure 4:
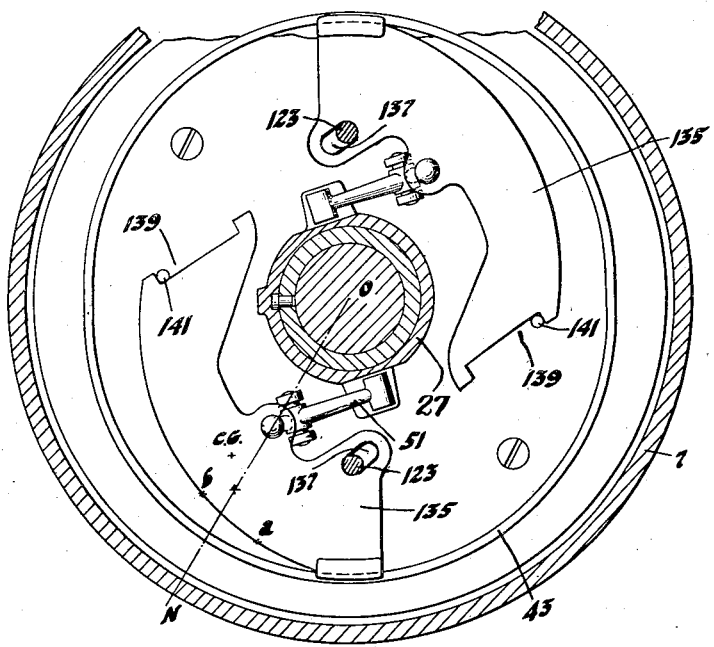
Fig. 4 is a section corresponding to Fig. 2 showing a modified form.

In the drawings numeral 7 is a housing enclosing the power transmission. At 9 is a partition separating some form of reversing gearing of which 11 is one element, from ratio changing mechanism of the friction roller type of which disc 13 is an element. The association of these two mechanisms is, of itself, not the subject of this application, and since the invention does not involve the details of either, only enough has been shown to illustrate the mechanisms with which this invention is concerned.

At 15 is the hollow input shaft extending from the gear 11 into the change speed part of the mechanism. It receives the end of an output shaft 17. Disc 13, being a driven disc, is secured to shaft 17 by means of a flange 19. The hollow input shaft 15 has a radial flange 21 to which is secured by fastening means 23 a drum 25. This is a drum which is connected to a driving disc (not shown) but resembling disc 13. Between the driving and driven discs are rollers as in transmissions of this kind.

Slidable on the hollow shaft 15 is a collar 27 engaged by one arm of a lever 30 pivoted at 29 on the partition 9. The other arm of the lever has connected thereto a link 31 which is to be operably connected in a known manner to the friction rollers in order to shift their driving relation to the discs and thereby change the speed ratio of the transmission. Suitable pins 33 carried by shaft 15 may project into slots in the collar 27 to properly guide the collar.

To rotate the lever 30 and change the ratio of the transmission the collar 27 is reciprocated by a centrifugal governor responsive to the speed of shaft 15. On pins 23 are also pivotally mounted weights 35, there being slots 37 in the weights to receive the pivot pins. At opposite ends of the weights are slots 39 and stop pins 41 are mounted on the flange 21 and are received in said slots. The spring element of the governor is a resilient hoop 43. This hoop is stretched over the weights and is held in position by said weights, the pins 23 and 41 providing for the limiting position of the weights under the influence of the resiliency of the hoop. The flange 21 is also provided with lugs 45 carrying pivot pins 47. On each of said pins 47 is pivoted a bell crank lever 51 having arms 53 and 55. Arm 53 engages in an opening 57 in the weight 35. Arm 55 engages the one or the other of the faces 59 on the collar 27. Swinging of the governor weights thereby reciprocates the collar. The bell crank lever is provided with a clearance on the pivot pins 47 as shown best in Fig. 2. By this clearance the pivotal connection of the bell crank lever accommodates itself to the swinging of the weights. The weights have preferably side flanges as at 61 to straddle and position the hoop.

It has been found desirable in governors of this general type that there should be two stages of operation, one wherein the spring resists the action of the weights in shifting the transmission from its lowest driving ratio toward higher speeds, and a second stage in which the spring offers greater resistance to the movement of the weights and the consequent shifting to maximum speed ratios. In the present invention provision is made for this two-stage action in the case of each weight.

Fig. 2 shows the weights in their position of rest. Under the increasing speed of the input shaft each weight rotates about its pivot pin 23, thereby further distorting the hoop 43. The hoop resistance has but a relatively short lever arm and therefore offers comparatively slight resistance to the movement of the weights as they act to increase the speed ratio of the transmission. During such movement the pin 41 approaches and finally contacts the inner end of slot 39, thereby preventing further rotation of the weight about the pivot pin 23. When the input shaft has attained a certain predetermined and greater speed the weight may rotate about the stop pin 41, this movement being made possible by the presence of slot 37. The governor then shifts the transmission to the highest ratios but does so against the action of the hoop spring now acting with a relatively long lever arm.

Fig. 4 shows a modified form of the invention wherein the hoop 43, the collar 27, and the bell crank levers 51 are provided and arranged as before. In this form of the invention each weight 135 is associated with a pivot pin 123 and with a stop pin 141. The pivot pin passes through a slot 137 and the stop pin operates in a slot 139. The connections of the bell crank with the collar and the weight are as in the form already described. In this second form, as the weight rotates about its pivot the arc of the weight in contact with the hoop changes until, varying from a point $a$ to a point $b$ it reaches a point $b$ through which extends the radius ON, passing through the center of gravity. Thereafter the rotation about 123 ceases. For higher speeds the weight moves bodily in a substantially radial direction until stopped by the pins 123 and 141. The pivotal movement about pin 123 constitutes the first stage of the action, and the bodily radial movement constitutes the second stage.

Figure 5:
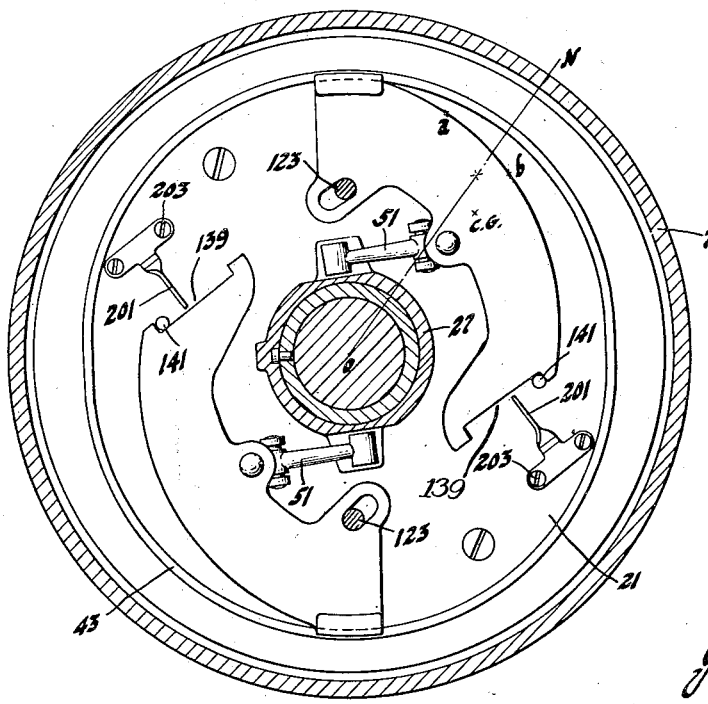
Fig. 5 is a similar view of a third form which the invention may take.

Fig. 5 shows a quite similar form. Here the hoop 43, the sleeve 27, and the bell crank levers 51 are used as in the other forms. The pivot pin 123 and the stop pin 141 are the same as in Fig. 2. In addition, a spring blade 201 is secured by fastening means 203 to the flange 21. This spring blade enters the slot 139. In this form of the invention as the speed of the input shaft increases the weights first swing about pivots 123 as before. This continues until the spring blade 201 is brought into contact with the inner end of slot 139. This retards the swinging motion of the weight about the pins 123. When, during this retarded swinging, the weight swings sufficiently to bring its center of gravity into the radius ON—the radius including the then reached point of contact $b$ between the shoe and the hoop—the swinging about 123 stops. Thereafter at a predetermined rate of rotation of the input shaft the weight moves substantially radially as in the case described above, the radial movement being combined with a slight rotary movement about the contact point of blade 201.

We claim:

1. In combination, a hoop-shaped spring, a plurality of weights engaging said spring, pivot means for said weights adjacent one end of each, stop pins adjacent the other ends of said weights, motion-transmitting means connected to said weights and rotatable means carrying said pivots and stop pins, and by its rotation producing the pivotal movement of said weights.

2. The invention defined by claim 1, a shaft carrying said rotatable means, said motion-transmitting means comprising a collar slidable coaxially of said shaft.

3. The invention defined by claim 1, each weight having a movement limiting slot adjacent the pivot means and stop pin whereby the rotation about the pivot means is limited by the engagement of the stop pin with the end of the slot to constitute a first stage, and rotation about the stop pin serves to constitute a second stage.

4. A spring hoop governor comprising a spring hoop, a centrifugally-operated weight engaging said hoop, first and second pivots for said weight, said weight formed with a movement-limiting slot adjacent each pivot whereby the movement about said first pivot is limited by the engagement of the second pivot with the end of its slot, thereafter the weight being rotatable about its second pivot, this latter movement being permitted by the slot adjacent the first pivot.

5. The invention defined by claim 4, said hoop and weight being operably engaged such that the resisting force offered by the hoop to the movement of the weight is greater in the case of one of said pivots than in the case of the other pivot.

6. A hoop governor comprising a single resilient hoop and a plurality of symmetrically-disposed weights located therewithin and holding said hoop in normally strained position, pivot means adjacent each end of said weights, each of said weights having a slot adjacent each pivot, each weight having its mass so distributed that its center of gravity is unequally distant from the two pivots.

JOHN O. ALMEN.
JOHN DOLZA.